United States Patent [19]
Berriman

[11] 3,879,286
[45]*Apr. 22, 1975

[54] FILTERING APPARATUS AND METHOD

[75] Inventor: Lester P. Berriman, Irvine, Calif.

[73] Assignee: Dresser Industries, Inc., Dallas, Tex.

[ * ] Notice: The portion of the term of this patent subsequent to June 13, 1989, has been disclaimed.

[22] Filed: June 12, 1972

[21] Appl. No.: 261,803

Related U.S. Application Data
[63] Continuation-in-part of Ser. No. 885,099, Dec. 15, 1969, Pat. No. 3,669,879.

[52] U.S. Cl. .................. 210/23; 210/331; 210/345; 210/409; 210/433
[51] Int. Cl. .......................................... B01d 13/00
[58] Field of Search ............. 210/321, 347, 334, 23, 210/433, 404, 345, 331, 380; 55/16, 158

[56] References Cited
UNITED STATES PATENTS

| | | |
|---|---|---|
| 2,422,882 | 6/1947 | Bramley............................. 55/16 X |
| 2,651,416 | 9/1953 | Van Den Mark et al....... 210/380 X |
| 3,171,808 | 3/1965 | Todd............................. 210/347 X |
| 3,190,449 | 6/1965 | Muller........................... 210/334 X |
| 3,400,074 | 9/1968 | Grehci........................... 210/321 X |
| 3,523,568 | 8/1970 | van Leeuwen................... 55/16 X |
| 3,583,567 | 6/1971 | Maestrelli..................... 210/345 X |
| 3,669,879 | 6/1972 | Berriman......................... 210/23 |

Primary Examiner—Frank A. Spear, Jr.
Attorney, Agent, or Firm—Lindenberg, Freilich, Wasserman, Rosen & Fernandez

[57] ABSTRACT

A method and apparatus for separating a carrier fluid from particles held in suspension in the fluid and which are of greater density than the fluid, which involves flowing the fluid with the particles therein along a screen while rapidly rotating the screen and fluid, the screen extending primarily radially from the axis of rotation. A high flow rate of fluid through the screen is achieved with minimum fouling of the screen by large particles lodging in the screen, and even particles of a size smaller than the holes in the screen do not pass through the screen.

12 Claims, 10 Drawing Figures

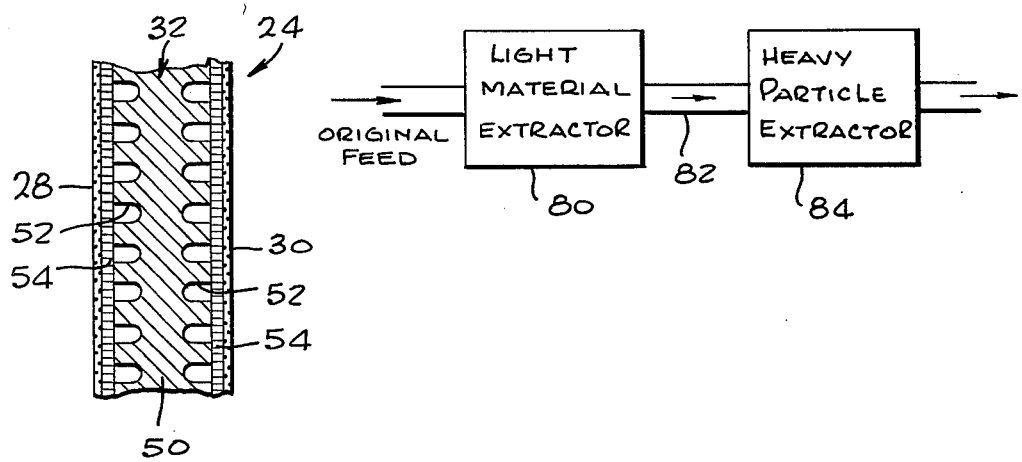
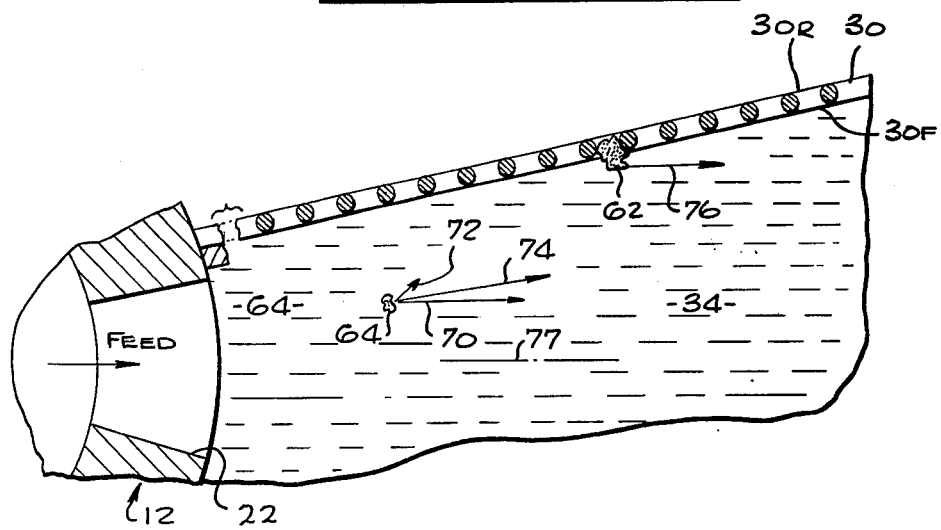
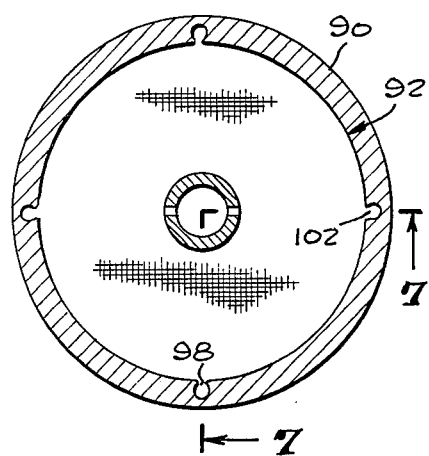

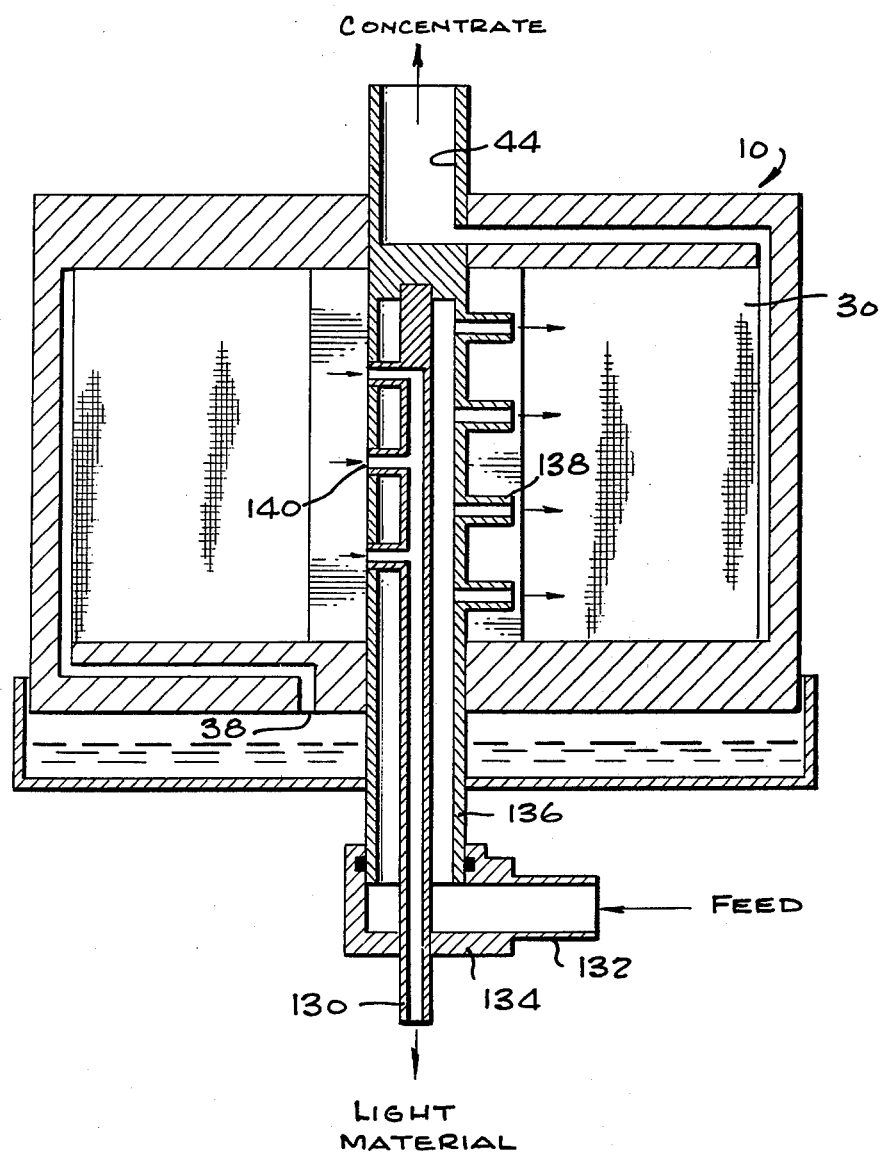

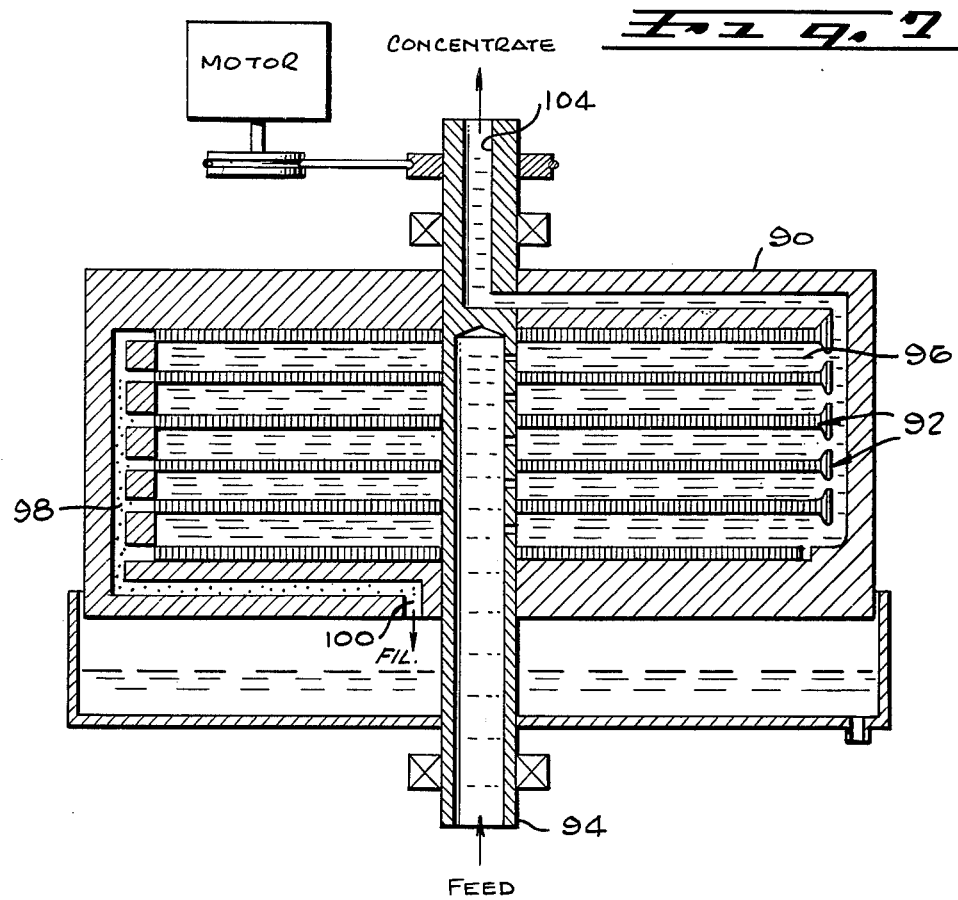
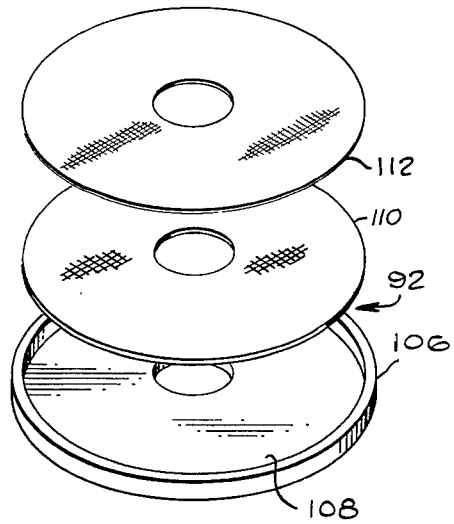
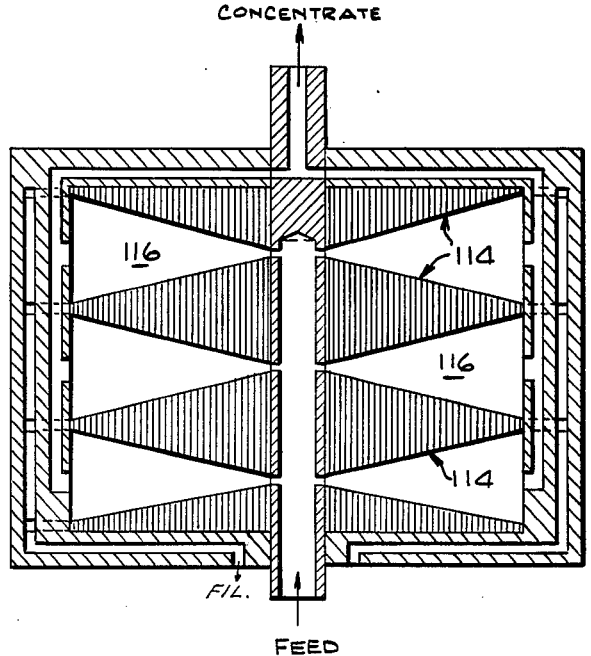

FILTERING APPARATUS AND METHOD

CROSS REFERENCE TO RELATED APPLICATIONS

This is a continuation in part of patent application Ser. No. 885,099 filed Dec. 15, 1969, now Pat. No. 3,669,879.

BACKGROUND OF THE INVENTION

This invention relates to methods and apparatus for separating a fluid from particles suspended therein.

There are a large number of applications wherein it is necessary to separate a carrier fluid such as water from microscopic particles that are held in suspension therein. In a large number of cases, the particles are of a material that is denser than the fluid, but the particles may be so small that they cannot be readily settled out of the fluid. One method that has been commonly used is micro straining or micro filtering, wherein the fluid with the particles therein is applied to one side of a screen that has very small holes or pores therein. If the particles to be rejected are very small, then it is necessary to use an extremely fine screen. Such screens are not only expensive, but they are limited to operations where there is only a low concentration of solids in the fluid, such as only a few hundred parts per million. Where there is a higher concentration of solids, particles too large to move through the screen tend to lodge in the holes of the screen and block or "blind" it.

SUMMARY OF THE INVENTION

In accordance with one embodiment of the present invention, a method and apparatus is provided for separating a fluid from particles more dense than the fluid that are held in suspension therein, which permits a higher flow rate of fluid per unit area of screen and which maintains the flow rate over a longer period of time than heretofore. The apparatus includes a rotatably mounted frame and a screen mounted on the frame and extending in a largely radial direction from the axis of rotation of the frame. A feed conduit feeds fluid with suspended particles therein along a first face of the screen, while a filtrate conduit carries away fluid which passes through the screen and a concentrate conduit carries away fluid with a high concentration of particles therein which has passed across the first face of the screen without passing through the screen. The frame is rapidly rotated so that a large centrifugal force is applied to the fluid and particles therein as it moves along the screen. The centrifugal force urges the particles to settle out of the fluid in a radially outward direction, so that the major force on the particles urges them radially outwardly rather than through the screen. Even particles much smaller than the holes in the screen tend to precipitate outwardly rather than flowing through the screen, and there is a minimal buildup of large particles on the screen that would tend to block it and reduce the flow rate. The combination of a centrifuge action that urges particles radially outwardly, together with the use of a screen that is oriented primarily perpendicular to radially outward flow results in a greater flow of filtered fluid than has been possible using either centrifuge separation or screening through a stationary or only slowly moving screen.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 is a greatly enlarged view taken on the line 3—3 of FIG. 2;

FIG. 4 is an enlarged view of particles and a portion of the screen of FIG. 1;

FIG. 5 is a simplified block diagram of a separating system of the invention;

FIG. 5A is a sectional side view of straining apparatus constructed in accordance with another embodiment of the invention;

FIG. 6 is a sectional top view of a filtering apparatus constructed in accordance with still another embodiment of the invention;

FIG. 7 is a view taken on the line 7—7 of FIG. 6;

FIG. 8 is a partial exploded view of a screen structure of the apparatus of FIG. 6; and FIG. 9 is a section side view of a filtering apparatus constructed in accordance with yet another embodiment of the invention.

DESCRIPTION OF THE PREFERRED EMBODIMENTS

Figure 1:
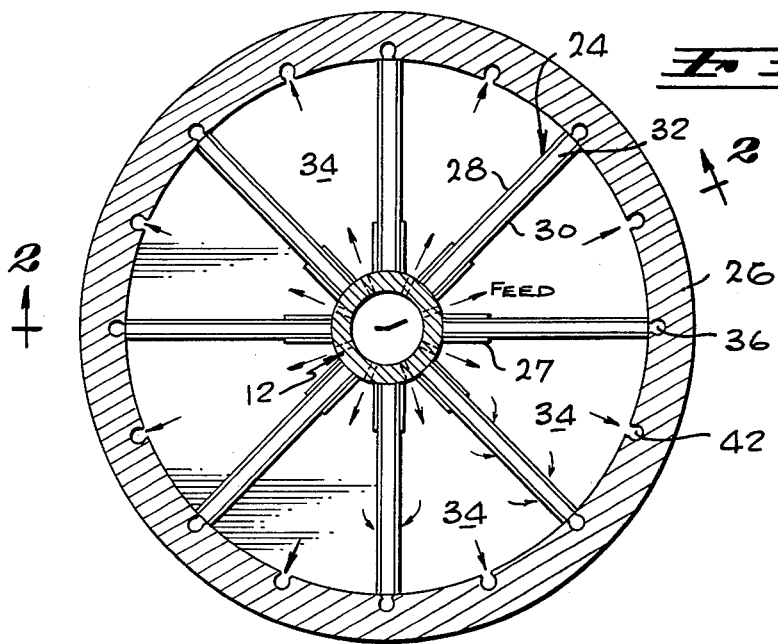
FIG. 1 is a sectional top view of a filtering or straining apparatus constructed in accordance with the present invention.
Figure 2:
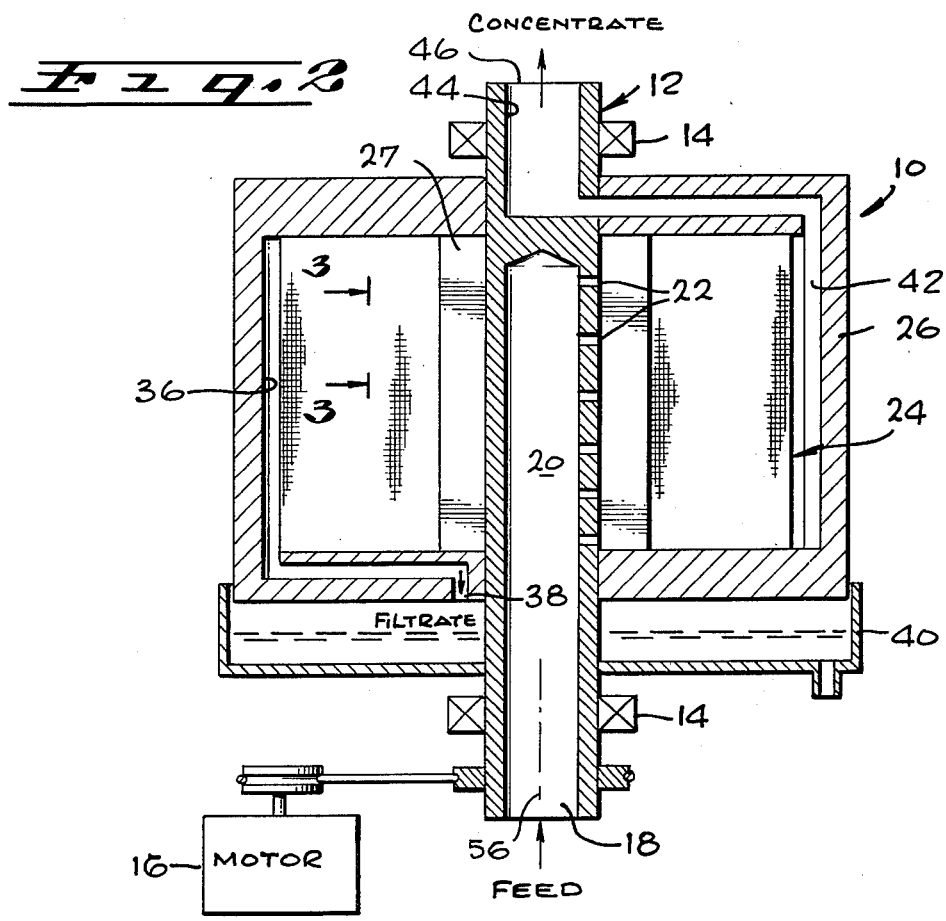
FIG. 2 is a view taken on the line 2—2 of FIG. 1.

FIGS. 1 and 2 illustrate a straining or screening apparatus which includes a frame 10 having a shaft 12 that is rotatably mounted on bearings 14, and which is rapidly rotated by a motor 16. The shaft 12 is hollow and has a feed input 18 through which a feed fluid is pumped, the feed fluid including a carrier fluid such as water containing particles of material more dense than the carrier fluid, or in other words of a greater specific gravity, such as is typically found in sewage. The feed fluid passes through a passageway 20 in the shaft and out through apertures 22. The frame 10 holds numerous screen assemblies 24 which extend radially between the shaft 12 and a surrounding wall 26 of the frame, and whose surfaces extend axially as well as radially. Baffles 27 seal the radially inner portions of the screens against the flow of fluid. Each screen assembly includes two screens 28, 30 on either side of a support 32. The feed fluid flows into passages 34 that are formed between the screens of two different screen assemblies and the surrounding wall 26 of the frame. A large portion of the carrier fluid passes through the screens 28, 30 and then along the support 32 which has numerous passageways for carrying the carrier fluid therealong. This carrier fluid or filtrate, which has passed through screens, passes into filtrate collector tubes or conduits 36 that extend axially to one end of the frame and then radially inwardly to filtrate outlets 38. The carrier fluid or filtrate emerging from the outlets 38 is collected in a filtrate collector 40, and may be pure enough for use or may be carried to further purifying apparatus. The feed fluid in the passageway 34 that does not pass through the sceens is collected in a concentrate conduit 42 which leads to another passageway 44 in the shaft and to a concentrate outlet 46. This concentrate, which includes carrier fluid with a higher proportion of particles than the feed fluid may be subjected to further treatment. In those cases where the particles are of no value, the concentrate may be treated to remove any additional carrier fluid so that a solid waste is provided which can be more easily disposed of.

FIG. 3 illustrates a portion of a screen structure 24, showing the support 32 that supports the screens 28, 30. The support 32 includes a backing plate 50 with grooves 52 therein that extend radially along the frame for carrying away the filtrate that has passed through the screens. A pair of large mesh support screens 54 lie between the support plate 50 and the fine screens 28, 30 to provide a more even support for the fine mesh screens. Fluid that passes through the screens is rapidly exhausted through the filtrate conduits 36, because a small pressure differential is maintained across the screens. This pressure differential exists during rotation of the frame because the filtrate outlet 38 is further from the axis of rotation 56 than the concentrate outlet 46.

The position of the filtrate outlet 38 relative to the concentrate outlet 46 determines the pressure differential across the screen (for a given speed of rotation and diameter of the frame). If it is desired to remove the filtrate at or near the axis of rotation, then a high pressure pump may be applied to the feed fluid in front of the entrance 18 to increase the inlet pressure. In the case of screens with a large pore size, a pressure differential of only a fraction of a pound per square inch is sufficient, while in the case of an ultra filter, a pressure differential of a few hundred psi may be needed.

FIG. 4 illustrates the process of the invention, showing how particles 60, 62 are rejected from the screen 30 while the carrier fluid 64 is encouraged to pass through the screen. As the frame or basket rotates, the feed fluid containing carrier fluid and particles tends to flow through the screen 30 to the filtrate outlet because of the pressure differential across the screen. This flow through the screen results in the particles 60, 62 and the carrier fluid being dragged towards the screen 30. If it were not for rapid rotation of the frame, then the screen 30 would act similarly to an ordinary stationary screen, wherein particles 60 smaller than the openings in the screen would initially pass through it while particles 62 larger than the holes in the screen would be stopped by the screen. It may be noted that in the case of an ordinary stationary screen, larger particles begin to block the pores, so that the effective screen size is reduced and even smaller particles are stopped. However, the flow rate also decreases, and such blockage by progressively smaller particles continues so that the flow rate through the screen is eventually reduced to a very low level, therefore requiring cleaning. In some prior art screening methods, a rapid flow of feed fluid has been maintained across the face of the screen to help dislodge some of the large particles, but considerable blockage still occurs. This is partly due to the fact that the velocity of the fluid in a direction along the face of the screen decreases to a small level near the surface of the screen, so there is only a small current component helping to sweep particles along the screen surface to resist lodging in the screen. In the present invention, however, a centrifugal force is applied to the particles that urges them to sweep across the screen rather than lodge in it or even pass through it and this force is fully applied to the particles even at the surface of the screen.

FIG. 4 illustrates two components of force acting on the particles 60, including the net centrifugal force indicated by arrow 70 (the centrifugal force on the particle minus the "buoyant" force of the surrounding fluid) and the fluid drag force indicated by arrow 72, the resultant of these two forces being indicated by arrow 74. The net centrifugal force 70, which is in a radial direction from the axis of rotation of the frame, is applied to any particle having a greater specific gravity than the carrier fluid 64. The entire passageway 34 is filled with the fluid, so that the only effect of centrifugal forces on the carrier fluid 64 is to provide a large pressure. The particles 60, which has a greater specific gravity than the surrounding carrier fluid 64, tends to "settle" in a radially outward direction because the centrifugal forces urging it outwardly are greater than the "buoyant" forces of the surrounding carrier fluid. This is the same effect that gravity has on the particles when they lie in a stationary carrier fluid, but the force produced by rapid rotation of the frame can be many times greater than that produced by gravity, so that a large force component 70 urges the particles radially outwardly. The resultant force 74 on the particle may urge the particle only very slowly towards the screen, or may even urge the particle away from the screen where the centerline 77 of the passage 34 diverts from the screen 30. In any case, a high proportion of particles may reach the radially outer end of the passage 34 before reaching the screen 30, so that these particles will be carried away in the concentrate conduit 42. Accordingly, even fine particles that are smaller than the pores of the screen tend to be rejected. A larger screen 30 can therefore be used to provide a high flux of filtrate through it, and yet the concentration of fine particles is reduced.

The fact that large centrifugal forces act on the particles means that larger particles 62 have a lesser tendency to block the screen. If there were no centrifugal force component 76 acting on the particle 62, then almost the only force acting on the particle would be due to carrier fluid 64 passing through the screen and dragging the particle against the screen where it could block the screen pores. As mentioned above, this is true even if water is rapidly moving parallel to the forward face 30F of the screen, because the velocity of the water parallel to the screen surface decreases to a low level at locations very close to the screen surface. The centrifugal force component 76, however, is maintained at a high level even very close to the screen, so that the particle 62 always tends to be dragged in a radial direction so it has a lesser tendency to move forcefully into the screen and lodge therein. Blockage of the screen is therefore reduced, and a high flow rate can be maintained over a long period of time.

It is generally necessary to rotate the screen structures at more than a certain minimum speed in order to obtain significantly better filtering than with a stationary screen. This is because a certain minimum centrifugal or "$g$" force is necessary to obtain a sharp separation of fluid from particles smaller than the screen pores and/or to prevent blockage of the screen. Of course, the speed required to reach a certain g force at the screen surface depends upon the radial distance of the screen from the axis of rotation. The g force at the innermost screen region should be at least 60 g's (i.e., 60 times the pull of gravity), and is preferably at least 120 g's. The radially innermost screen region can be extended close to the shaft so that the $g$ force is lower than the minimum required for cleaning or sharp separation of particles from the fluid at the operating rotational speed. In that case, the innermost screen region will allow smaller particles to pass through initially, but as larger particles block the pores, the effective pore size will decrease until substantially no fluid or particles pass through that region of the screen.

FIG. 5 illustrates a system which can be utilized to purify a feed that contains carrier fluid which is contaminated by lighter material held in suspension, such as oil, as well as by heavier material held in suspension. If the feed were applied directly to the rotating basket apparatus of FIGS. 1-4, the lighter material may not merely pass through the screens, but may tend to foul them. For example, oil might form a film on the screen which might block the pores and which also might tend to hold onto particles. In order to prevent such fouling, the original feed is passed through a light material extractor 80 which removes light material. A wide variety of such extractors are known, such as extractors that utilize chemicals for combining with prevelant light material such as oil. The remaining feed which contains substantially only carrier fluid and particles of greater density than the carrier fluid is passed through a conduit 82 to a heavy particle extractor 84 which includes the rotating frame apparatus of FIGS. 1-4.

FIG. 5A illustrates a separator constructed in accordance with another embodiment of the invention, for separating both heavier and lighter materials from the carrier fluid in the same machine. The apparatus is similar to that of FIGS. 1 through 3 except that an additional light material conduit 130 is provided to carry away material of low specific gravity such as oil. The feed fluid, which contains carrier fluid and particles more dense than the carrier fluid, and which is contaminated with the less dense material, enters a pipe 132. The feed passes through a rotary seal 134 to a shaft 136 and through outlets 138 that are radially spaced from the shaft. The light material moves radially inwardly, or "floats" towards the shaft, and enters inlets 140 that connect to the light material conduit 130. As in the apparatus of FIG. 1, the carrier fluid flows through the screens 28, 30 and out through the filtrate outlet 38, while the concentrate containing some carrier fluid and a high proportion of the dense particles flows out through the concentrate passageway 44.

FIGS. 6 and 7 illustrate another embodiment of the invention, which utilizes a rotating frame 90 with disc-like screen structures 92 extending in planes perpendicular to the axis of rotation, that permit the use of a very large area of screen in a rotating frame of given size. The apparatus includes a shaft 94 which carries feed fluid containing the carrier fluid and particles more dense than the carrier fluid to passages 96 that are located between pairs of screen structures 92. The feed continually moves radially outwardly from the shaft, with the carrier fluid moving through screens of the screen structures 92 to filtrate conduits 98 that lead to a filtrate outlet 100. The portions of the feed that do not pass through the screens pass into a concentrate conduit 102 that lead to a passageway 104 in the shaft from which the concentrate is taken away. Each of the screen structures 92 is constructed as illustrated in FIG. 8. The structure includes a support plate 106 with recesses 108 on either side. A support plate 110 is received in the recess on each side of the plate, and a fine screen 112 is mounted over each support screen.

FIG. 9 illustrates still another screening or filtering apparatus, which is similar to the apparatus of FIGS. 6-8, except that each screen structure 114 has a conical screen instead of having a flat screen surface. The use of the conical screen structures results in passages 116, where feed fluid passes along the front face of the screens, being of continually increasing cross-sectional area at positions progressively further from the axis of rotation of the frame. As in the apparatus of FIGS. 1-4, this allows the net or resultant force on particles to urge them away from the screens instead of merely providing a large force component along the surface of the screen. Also, in the apparatus of FIG. 9, even particles at the surface of the screen are urged away from the screen by centrifugal forces. This is especially useful where the screen has a rough surface that can prevent particles from readily sweeping across its surface.

Thus, the invention provides a screening or filtering apparatus for separating a carrier fluid from particles that are held in suspension therein and which are denser than the carrier fluid. The apparatus utilizes a screen which is rapidly rotated and which extends in a primarily radial direction from its axis of rotation. Particles suspended in the carrier fluid which are more dense than the carrier fluid are urged radially outwardly, or in other words with large directional component along the surface of the screen. This centrifugal force acts on the particles even for particles that are at the boundary of the screen. this large force component along the face of the screen reduces the tendency of the particles to move through the screen with the carrier fluid. This reduces the tendency of particles which are larger than the screen to become lodged in the screen and block it. In addition, even particles smaller than the pores of the screen may resist flowing through the screen, so that the apparatus can be constructed to reduce the concentration of particles smaller than the holes in the screen, thereby permitting larger screens and therefore larger flux rates of carrier fluid through the screen. Although the feed fluid is shown flowing radially, it can flow in any other direction along the screen.

It may be noted the apparatus and processes of this invention are basically directed to the filtering of suspended particles rather than elimination of dissolved materials such as occurs in reverse osmosis, inasmuch as the process here involves the tendency of more dense particles to settle in a radially outwardly direction from the carrier fluid around them, and because screens with holes in them are utilized rather than reverse osmosis membranes which normally do not have holes for the passage of fluid. Furthermore, the process of this invention utilizes rotation of the frame to urge particles to "settle" or move radially outwardly, rather than to build up a high pressure head. A pressure head will develop in the apparatus of this invention due to the rotation of the fluid and the appreciable radial length of the passageway that contains the fluid, but only a very small pressure difference is required on the different sides of the screens, such as only pressure differential of several inches of water, in order to cause fluid to pass through the screen. This may be compared to reverse osmosis wherein a pressure difference on opposite sides of the membrane of perhaps 1,500 psi is required. In the screening apparatus of this invention a pressure along most of the screen of less than 500 psi is generally desireable to reduce stresses on the machinery and because a large pressure head is not required. However, the rotational speed should be great enough to provide a centrifugal force at least 60 times the force of gravity along a majority of the screen face. A pressure head which is only moderate is obtained even though the frame is rapidly rotated by making the passage short in a radial direction.

The apparatus of this invention can be utilized with a wide variety of fluids. Some examples of situations where the screening apparatus of this invention can be utilized are in separating sewage particles from water, separating the protein in whey from water (the protein consists of large molecules that are larger than the pores of an ultrafilter), and the separation of bacteria from fluid in food processing. In addition to water and other liquids, it is possible to screen air so as to separate out fine particles of ash or other material that is held in suspension. In the case of gases such as air, it is not necessary to initially rotate the input fluid or feed, inasmuch as air that is substantially stationary and directed against a rapidly rotating screen will be rapidly rotated when it reaches the screen and particles therein will then be subjected to centrifugal forces. Screens can be used that have pore sizes within a very large range, from 20 angstroms to 100 microns or more. In the case of pores between 20 and 400 angstroms, organic screens may be used such as cellulose acetate, polyethylene, or nylon, while larger screens may be constructed of material such as woven stainless steel.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for separating a carrier fluid from particles that lie in suspension in the fluid comprising:
   a frame;
   means for rotatably supporting said frame;
   motor means coupled to said frame to rotate it;
   a screen mounted on said frame, said screen having first and second faces extending with a primarily radial directional component from the axis of rotation of the frame and having a multiplicity of holes;
   first conduit means for applying feed fluid containing the carrier fluid and suspended particles, to a radially inner location along said screen at a first face thereof;
   second conduit means for carrying away filtrate that includes primarily the carrier fluid, that has passed through said screen; and
   third conduit means for carrying away concentrate that includes carrier fluid with suspended particles therein that has passed to the radially outermost portion without having passed through the screen;
   said frame having a surrounding wall which rotates with the rest of the frame to form a substantially closed container that can be filled with the carrier fluid and suspended particles.

2. The apparatus described in claim 1 wherein:
   said frame and screen define a passage extending in a primarily radial direction between said first and third conduit means, said passage having a centerline which lies progressively farther from the screen at progressively further distances along the centerline from the axis of rotation of the frame.

3. The apparatus described in claim 1 wherein:
   said motor means rotates said frame so that the fluid beside a majority of the first screen face area is under a centrifugal force of at least sixty times the pull of gravity.

4. The apparatus described in claim 1 wherein:
   said second conduit means extends radially inwardly to an outlet spaced a small distance from the axis of rotation of the frame, where the filtrate leaves the rotating frame; and
   said third conduit means extends radially inwardly to a second outlet where the concentrate leaves the frame, said second outlet located closer to the axis of rotation than said first named outlet, whereby to create a pressure differential that pumps fluid through the screen while conserving energy.

5. Apparatus for separating a carrier fluid from suspended particles of greater specific gravity than the carrier fluid comprising:
   a rotatably mounted frame;
   means for rotating said frame;
   a plurality of screen structures mounted in said frame, each including a screen and a screen support both extending in a primarily radial direction from the axis of rotation of the frame, pairs of said screen structures forming fluid passages;
   first conduit means for applying feed fluid containing the carrier fluid and particles to said passage;
   second conduit means for carrying away filtrate containing carrier fluid that has passed through said screens; and
   third conduit means located at the radially outermost portions of said passages for carrying away concentrate which includes carrier fluid and particles which have not passed through said screen;
   said frame including a surrounding wall which rotates with the rest of the frame to form a substantially closed chamber that can be filled with the carrier fluid with suspended particles.

6. The apparatus described in claim 5 wherein:
   the surfaces of said screen extend axially as well as radially, and said screen structures are circumferentially spaced from each other about the axis of rotation of the frame.

7. The apparatus described in claim 5 wherein:
   said screen structures define passages that are of progressively increasing cross-sectional area at progressively increasing distances from the axis of rotation of said frame.

8. Apparatus for separating a carrier fluid from material mixed with it wherein the material includes a first substance less dense than the carrier fluid and particles of a second substance more dense than the carrier fluid comprising:
   a first separation station which includes means for removing said first substance from the carrier fluid;
   a second separation station for removing said particles of said second substance from the carrier fluid;
   first means for transporting carrier fluid containing said first substance and particles of said second substance to said first separation station; and
   second means for transporting the output of said first station to said second station;
   said second separation station including
   a rotatably mounted frame,
   means for rotating said frame, means defining a passageway in said frame that extends radially from the axis of rotation, including a screen with a first face along said passageway;

means for flowing the carrier fluid with said material therein through said passageway, and means for carrying out fluid from a side of said screen opposite the first face thereof.

9. A method applicable to a feed containing a carrier fluid and particles heavier than the fluid, for separating the carrier fluid from the particles, comprising:

flowing said feed containing carrier fluid with the particles therein along a first face of a screen from a first end thereof to a second end thereof;

exhausting fluid from a second face of the screen opposite the first face, to create a pressure differential across the screen that urges the passage of the carrier fluid from the first face of the screen to the second face of the screen;

rapidly rotating the screen and the carrier fluid and particles about an axis that is oriented so that the screen extends primarily radially from said axis, and at a speed that causes a greater proportion of particles that are smaller than the openings in the screen to reach said second end of the screen at said first face thereof than the proportion of carrier fluid, while flowing said feed along said screen and exhausting said fluid from the second screen face, and supporting fluid on said first face of said screen against unrestricted radially outward movement, whereby centrifugal forces resulting from rapid rotation can act for an appreciable time on particles so their precipatation helps in preventing movement to the screen.

10. The method described in claim 9 wherein:
the screen is rotated at a speed which produces a centrifugal force along most of the screen of more than sixty times the force of gravity.

11. The method described in claim 9 wherein:
the screen is rotated at a speed which produces a centrifugal force along most of the screen of more than one hundred twenty times the force of gravity.

12. Apparatus for separating a carrier fluid from particles that lie in suspension in the fluid comprising:

a frame (10);

bearing means (14) for rotatably supporting said frame;

motor means (16) coupled to said frame to rapidly rotate it;

a screen (28) mounted on said frame, said screen extending in a radial direction from the axis of rotation (56) of the frame and having a multiplicity of holes;

first conduit means (18) for applying feed fluid containing the carrier fluid and suspended particles, to a radially inner location along said screen at a first face thereof;

second conduit means (36) for carrying away filtrate that includes primarily the carrier fluid, that has passed through said screen; and third conduit means (42) for carrying away concentrate that includes carrier fluid with suspended particles therein that has passed to the radially outermost portion without having passed through the screen;

said frame having a surrounding wall (26) which rotates with the rest of the frame to form a substantially closed container that can be filled with the carrier fluid and suspended particles.

* * * * *